United States Patent [19]

Coulter et al.

[11] 3,988,481
[45] Oct. 26, 1976

[54] CHEESE MANUFACTURE FROM MOLECULAR SIEVED MILK

[75] Inventors: Samuel T. Coulter, Marine-on-St. Croix; Howard A. Morris; Rulon A. Chappell, both of St. Paul, all of Minn.

[73] Assignee: The Regents of the University of Minnesota, Minneapolis, Minn.

[22] Filed: July 2, 1970

[21] Appl. No.: 52,013

[52] U.S. Cl. .................................. 426/40; 426/36; 426/491; 426/582
[51] Int. Cl.² ........................................ A23C 19/02
[58] Field of Search ................ 99/59, 116; 426/36, 426/40, 361, 491, 582

[56] References Cited
UNITED STATES PATENTS

| | | | |
|---|---|---|---|
| 346,062 | 7/1886 | Oatman | 99/116 |
| 1,711,032 | 4/1929 | Richardson | 99/116 |
| 2,681,858 | 6/1954 | Stimpson | 99/59 X |
| 3,531,297 | 9/1970 | Kielsmeier et al. | 99/116 |
| 3,583,968 | 6/1971 | Pien | 99/116 |

OTHER PUBLICATIONS

Hutin, J., La Fromagerie De L'An 2000., La Technique Laitere, No. 3, 1960, (pp. 33–37).
De Koning, P. J., Gel Filtration, A New Method Applied for the Preparation of Lactose–Free Milk, Neth. Milk. and Dairy J. 16 (1962), (pp. 210–214+216).

*Primary Examiner*—David M. Naff
*Attorney, Agent, or Firm*—Burd, Braddock & Bartz

[57] ABSTRACT

Cheese is prepared from milk which has been delactosed and dewatered by a process involving standardizing fluid whole milk, molecular sieving the standardized milk to substantially separate and remove lactose and water soluble minerals from the milk to render the milk substantially sugar-free, at least partially dewatering the substantially sugar-free milk to substantially the water content desired in a finished cheese, adding a curd foaming agent to produce curd, subjecting the resultant curd to conventional manipulation without substantial syneresis to produce cheese, and molding the resulting cheese to form.

10 Claims, 1 Drawing Figure

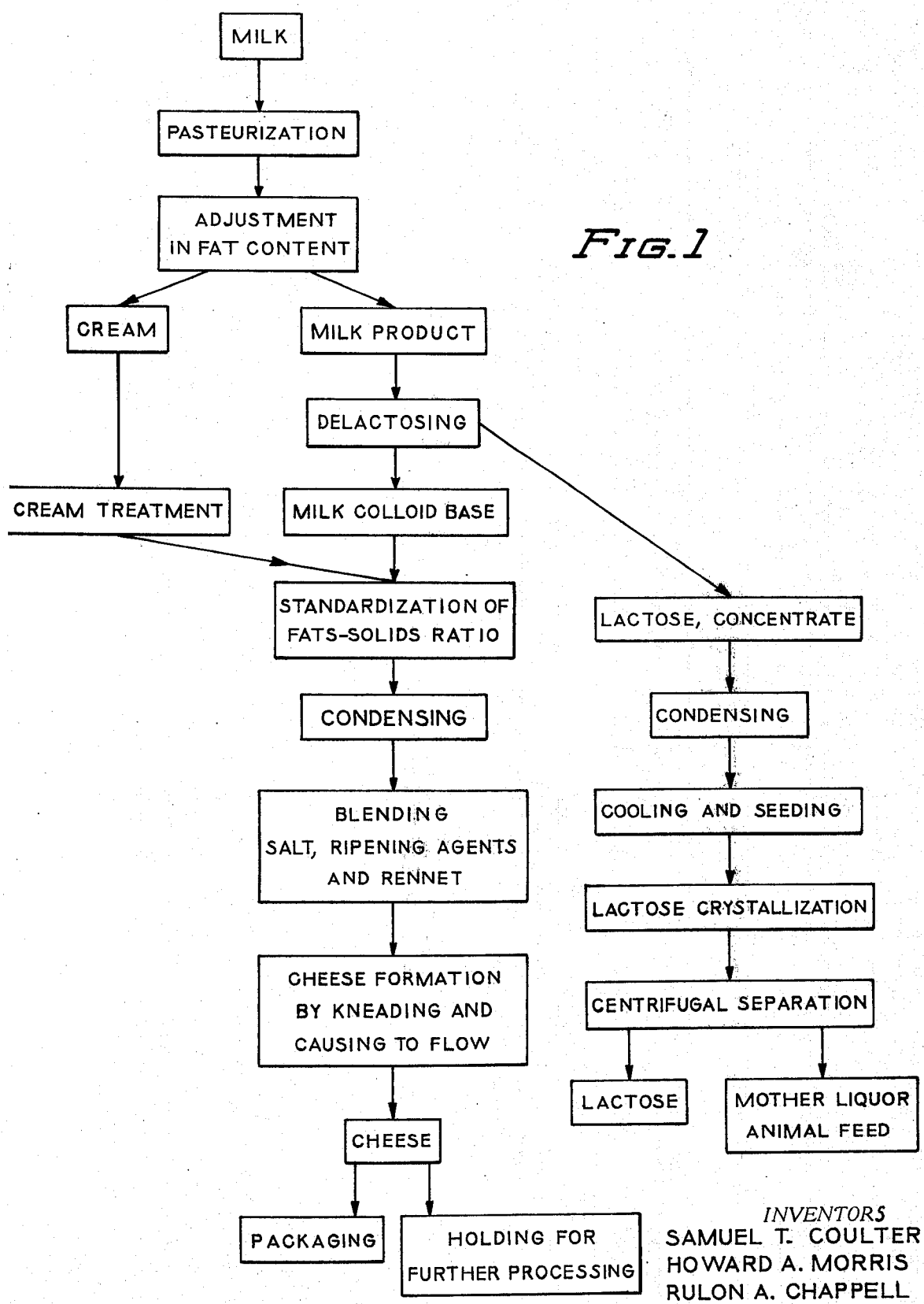

CHEESE MANUFACTURE FROM MOLECULAR SIEVED MILK

This invention relates to a new process for manufacturing cheese directly from milk with substantial or total reduction of the need for whey drainage. Milk, skim milk or partially skimmed milk, is treated to at least partially remove lactose and other soluble minerals, and then partially dewatered. A curd-forming agent is admixed with the delactosed milk product along with optional flavoring agents; ripening agents; fat, such as cream; and the like. The mixture is desirably kneaded or caused to flow, as by extrusion, to produce a proper uniform curd structure. The resulting cheese curd may then be packaged directly or may be subjected to ripening or other processing before packaging. As described in detail hereinafter, other cheese foods are prepared from delactosed milk products.

Cheese manufacture is of ancient origin. Cheese is manufactured in all parts of the earth. Although more than 800 named cheese varieties are known, most, including the familiar Cheddar; Swiss, Brick; the mold-ripened cheeses, Blue, Roquefort, etc.; and the like; are prepared by generally the same method. Fluid milk from the cow, goat, ewe or other animal is clotted with rennet or rennet substitutes. The resulting clot is cut or broken to permit syneresis (whey drainage). Syneresis may be hastened by heating, acid formation, stirring, etc. The whey is drained and the curd is manipulated. The manipulation process is peculiar to the individual cheese. The curd may then be salted and is placed in forms or molds to permit further whey drainage, or salting may be delayed until after individual cheeses are formed. The cheeses may be ripened by bacteria or mold or surface micro-organisms or by a combination of these, or may be unripened. The cheeses may vary from very hard (grating) cheese through hard, semi-soft to soft cheeses. Most cheese is "natural" as opposed to "process." Processed cheeses are made by grinding and blending a combination of one or more kinds of natural cheese with the addition of salts or other flavoring agents, heating to melt, and then molding to desired shape or form.

In conventional Cheddar cheese manufacture, which is typical and most widely practiced, from four to five hours or more is required from renneting to placing in forms or molds for pressing. Additional time ranging from an hour to a day or more is required before the cheese is placed in the final form. For many types of cheeses, this latter handling may extend for several days. Considerable manual manipulation and supervision of the cheese manufacture is required.

The process for cheese manufacture according to the present invention avoids some of the disadvantages and shortcomings of the prior art. It lends itself to mechanization and automation. The time required from renneting to putting in forms or molds for pressing is reduced from several hours to minutes. The cheese-making mixture is composed of ingredients in essentially the same amounts and proportions as desired in the finished cheese. Because of this, product uniformity may be insured and a wide variety of known cheeses can be produced and, by varying ingredients, new cheese products may be made. The finished cheese product may be made so as to have higher protein content. Complete control of micro-biological properties of the cheese is possible, including sterility of product.

The process of cheese manufacture of the invention is illustrated in the schematic diagram of the accompanying drawing which is a flow sheet of a process for manufacturing cheese according to the present invention.

The following table compares the composition of typical Cheddar cheese with that of milk and whey:

|  | Milk | Cheese | Whey |
| --- | --- | --- | --- |
| Water | 87.5% | 38% | 93.5 |
| Fat | 3.6 | 32 | .3 |
| Lactose | 4.8 | trace | 4.9 |
| Casein | 2.5 | 25 | trace |
| Whey proteins | 0.7 | trace | .8 |
| Minerals (ash) | 0.9 | 3.7 | .5 |

It will be noted from this comparison that conventional cheese manufacture basically removes most of the water, lactose and some minerals (those which are soluble) from milk. These substances along with most of the whey proteins constitute the whey which is drained and separated from the cheese curd in conventional cheese manufacture. According to the present process, most of the lactose, soluble minerals and water are removed from the milk prior to curd formation. This permits partial or total elimination of syneresis and direct conversion of a prepared mixture of desired composition to cheese of corresponding composition.

As illustrated schematically in FIG. 1, milk, which is ordinarily cow's milk but may be that of any milk producing animal, is preferably first pasteurized, although unpasteurized milk may be used. The fat may or may not be totally or partially removed by separation, either as cream or directly as milk fat. The milk or resulting skim milk is subjected to molecular sieving to remove most of the lactose and soluble minerals. Molecular sieving may be accomplished by gel filtration using a manufactured gel filtering agent such as those sold under the trademarks "Sephadex" and "Bio Gel," or by electrodialysis or by reverse osmosis, as by use of reverse osmosis membrane such as that manufactured by Eastman Chemical Products. The milk product is desirably condensed to about 20 – 30 percent total solids before delactosing to reduce the bulk necessary to be handled. The delactosed and partially demineralized milk product, containing principally protein in the form of casein and water and with or without fat, is then concentrated to about 40 – 50 percent solids by removing much of the water, as in a conventional vacuum evaporator supplemented by evaporation under vacuum in a swept surface evaporator, or in a spray or other suitable dryer. The resulting mixture contains water, protein, milk minerals and a very small amount of lactose, all in essentially the same amounts and proportions as in Cheddar cheese at pressing time. The amounts and proportions can be adjusted depending upon the analysis of the type of product desired. The descriptions and analyses of more than four hundred cheese varieties are contained in U.S. Department of Agriculture Agricultural Handbook No. 54 (1953).

Fat, if not already in the required proportion (0 to about 50 percent on a dry matter basis), is emulsified into the mixture before final concentration, or later if desirable. The cream which has been separated from the original fluid milk may be added directly, or the cream may be cultured, treated or ripened separately before being added, and blended with the other constituents of the cheese-making mixture. Fat other than cream or milk fat can be used for all or part of the fat. Protein, such as soy protein isolates, sodium caseinate, and the like, can be used for part or all of the protein. Flavoring agents, such as salt; ripening agents, such as micro-organisms as cultures or as cell concentrates, enzymes, molds, bacteria, etc.; coloring agents; other salts, emulsifiers, stabilizers, etc., are added along with or without an acidulent and a curd-forming agent, such as rennet or rennet substitute, and blended into the mixture. Preripened cheese or cheese preparations produced from similarly prepared mixtures or made by other processes can also form part of the cheese-making mixture.

Rennet is ordinarily added in cold water solution and blended with the mixture by manipulation such as kneading or extrusion or other means to convert the mixture directly into cheese. Renneting is carried out at a temperature suitable for rennet action. This temperature is ordinarily between about 80° and 105° F. The curd is desirably caused to flow first in one direction and then in another in order to secure a proper curd structure. The resulting cheese curd, produced in a matter of minutes from renneting, is then formed into desired shape. A minimum amount of syneresis may be necessary for proper structure development. The molded or otherwise shaped cheese may be packaged directly in the final package for storage or shipment and sale, or it may be held for repackaging, or it may be processed either immediately or after holding.

Under some circumstances, it is desirable to add the curd-forming agent immediately prior to packaging. The rennet is thoroughly admixed and blended with the other cheese ingredients, dispensed while still in liquid or semi-solid form into the final package and permitted to set up after packaging.

The lactose and minerals removed from the skim milk as a result of the molecular sieving step may be recovered as a valuable by-product. The lactose concentrate is condensed and cooled and seated to cause the lactose to crystallize. The lactose crystals may be recovered by centrifugal separation or other appropriate means. The remaining mother liquor is useful as a nutritious animal feed.

The method of delactosing and demineralizing the skim milk is not critical. A comparison of the composition of concentrated skim milk with delactosed and demineralized colloid fractions prepared from concentrated skim milk by three different methods is shown in the following table:

The invention is described in greater detail in the following examples which are intended to be illustrative only and not limitative of the invention:

EXAMPLE I

Delactosed and partially demineralized skim colloid is prepared as follows: 100 pounds of whole cow's milk, whose proximate analysis showed 3.8 pounds of fat, 3.5 pounds protein, 4.8 pounds carbohydrates, 0.9 pound salts and ions (25.3 percent protein in total solids), was separated into 6.35 pounds of 60 percent butterfat cream and 93.65 pounds of skim milk. The cream contained ≈3.8 pounds fat (>99 percent of original), 0.23 pounds protein (6.6 percent of original) and 0.273 pound carbohydrate (5.7 percent of original). The skim milk contained 3.27 pounds protein (93.5 percent of original), >0.1 pound fat and 4.53 pounds carbohydrate (94.5 percent of original). The skim milk contained 42 percent protein in the total solids. The skim milk was condensed to 30 percent total solids and subjected to a centrifugal Sephadex fractionation treatment generally according to the procedure described by Morr et al in the *Journal of Dairy Science*, Volume 50, No. 3, pages 305–306. 22.3 pounds of skim colloid was obtained containing 2.88 pounds protein (88 percent of original) and 0.24 pound carbohydrate (5 percent of original), the protein representing 86.5 percent of the total solids.

EXAMPLE II

Cheese curd was prepared from delactosed skim colloid as follows: 100 grams cream containing 60 grams fat (60 percent) and 200 grams skim colloid containing 22.3 grams protein and 7.7 grams lactose and salts was blended with 0.5 gram $CaCl_2$ and 0.2 ml rennet (undiluted). This mixture was allowed to set up as a curd. The curd was cut into approximately ½ inch squares. As much of the curd as could be removed from the mixing chamber (271 grams) was transferred to a small press and held under 1.7 psi for 2 hours. The resulting cheese curd in the amount of 179 grams contained 28.7 percent fat, 42 percent water, 21.1 percent protein, 8.2 percent lactose and salts. The whey removed (92 grams) contained 6 percent protein.

EXAMPLE III

Skim colloid was obtained by treating condensed skim milk by the centrifugal Sephadex method previously described in Example I. The skim colloid was mixed with butter oil containing 1 percent Tween 80 emulsifier and homogenized at 2500 psi on the first stage and 500 psi on the second stage. This mixture was then concentrated in a laboratory model flash evapora-

|  | % Total Solids | % Carbohydrate | % Ash | % Protein | % Protein in Total Solids |
|---|---|---|---|---|---|
| Condensed Skim Milk | 30.06 | 15.2 | 2.54 | 11.23 | 37.4 |
| Skim Colloid by Dialysis | 30.0 | .735 | 2.02 | 26.3 | 87.7 |
| Skim Colloid from Bio Gel | 30.0 | 1.86 | 2.45 | 25.0 | 83.5 |
| Skim Colloid from Sephadex | 30.0 | 2.22 | 2.48 | 25.3 | 84.5 | tor to 56 percent total solids (34 percent fat). A drop of undiluted rennet extract mixed in 200 grams of the above mixture produced a smooth, firm curd in less than 5 minutes.

EXAMPLE IV

Skim colloid was obtained by treating condensed skim milk by the centrifugal Sephadex method previously described in Example I. It was then concentrated in a laboratory model flash evaporator.

Cream containing 35 percent fat was inoculated with 1 percent S. lactis culture and incubated overnight at 20° C. One hundred grams of this cultured cream was placed in a vessel with constant mixing while 35 grams commercially obtained sodium caseinate with 1 gram $CaCl_2$ was slowly added. This preparation was mixed with 100 grams concentrated skim colloid and 0.1 ml rennet extract in 5 ml water. A curd containing 57.8 percent total solids and 32.7 percent fat was obtained.

EXAMPLE V

Skim colloid was obtained by treating condensed skim milk by the centrifugal Sephadex method previously described. It was then concentrated in a laboratory model flash evaporator.

Cream containing 35 percent fat was inoculated with 1 percent S. lactis culture and incubated overnight at 20° C.

Skim colloid powder was obtained by spray drying skim colloid.

Skim colloid powder was added gradually to 100 grams of the cultured cream, with constant mixing, to as high a level as appeared to be hydrated in the cream. This mixture was then added to 100 grams concentrated skim colloid and 0.1 ml rennet extract in 5 ml water to form a curd.

EXAMPLE VI

Skim colloid was obtained by treating condensed skim milk by the centrifugal Sephadex method previously described.

Skim colloid powder was obtained by spray drying skim colloid.

Skim colloid was mixed with butter oil containing 1 percent Tween 80 emulsifier and homogenized at 2500 psi on the first stage and 500 psi on the second stage. Skim colloid powder was added to the homogenized mixture to raise the solids not fat level. It was then concentrated in a laboratory model flash evaporator to 53 percent total solids (27.5 percent fat).

Three different approaches were tried in forming a cheese curd:

400 ml concentrate
20 ml (½ percent) S. lactis starter
0.5 ml rennet

1. The ingredients were mixed and allowed to form a curd. The curd was cut into cubes, ½ percent salt was added and the curd was pressed overnight.

2. The curd formed when the ingredients were mixed was removed intact from the beaker and soaked in brine solution overnight.

3. Salt (½ percent) was added before rennet. After the curd was formed, it was removed from the beaker intact.

All three samples showed some syneresis, No. 1 giving the most whey and No. 3 giving more than was observed in No. 2. There was no measure of the whey that may have been expressed during the brine treatment.

EXAMPLE VII

Skim colloid was obtained by treating condensed skim milk by the centrifugal Sephadex method previously described. The skim colloid was concentrated in a laboratory model flash evaporator. Cream containing 60 percent fat was mixed with the concentrated skim colloid. In a series of experiments, three treatments were tried, singly and in combination. Sodium caseinate was added to the cream, carrageenan (1 percent) was added to the skim colloid-cream mixture, and S. lactis culture (2 percent) was added to the mixture. Rennet containing $CaCl_2$ was added to form a curd. The curd was cut into cubes and pressed. The average composition of the pressed curd was 60 percent total solids and 30 percent fat. Slight syneresis was observed in all cases with no significant difference in the quantity of whey expelled between the treatments.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. A process for manufacturing a substantially sugar-free cheese food comprising the steps of:
   A. standardizing fluid whole milk to secure the desired ratio of fat to other milk solids,
   B. molecular sieving the resulting milk product to substantially separate and remove lactose and water soluble minerals from the milk to render the milk substantially sugar-free,
   C. at least partially dewatering the resulting substantially sugar-free milk colloid to substantially the water content desired in the finished cheese food,
   D. adding a curd-forming agent,
   E. subjecting the resulting curd in the cheese-making mixture to conventional manipulation to promote proper curd formation, and without any substantial syneresis, and
   F. molding the resulting cheese to form.

2. A process according to claim 1 further characterized in that said molcular sieving is accomplished by gel filtration of the milk product.

3. A process according to claim 1 for making a cheese of higher fat content further characterized in that further fat is added to the delactosed milk colloid.

4. A process according to claim 3 further characterized in that said fat is added to the cheese-making mixture along with said curd-forming agent and blended into the curds as formed.

5. A process according to claim 3 further characterized in that said fat is added as a substance selected from the group consisting of cream, milk fat, other edible animal fats and oils and vegetable fats and oils.

6. A process according to claim 1 further characterized in that salt is added to the cheese-making mixture along with said curd-forming agent and blended into the curds as formed.

7. A process according to claim 1 further characterized in that a ripening agent is added to the cheese-making mixture along with said curd-forming agent and blended into the curds as formed.

8. A process according to claim 1 further characterized in that the curd is manipulated by extrusion.

9. A process according to claim 1 further characterized in that the curd is manipulated by kneading.

10. A process according to claim 1 further characterized in that additional protein is admixed with the cheese-making mixture.

* * * * *

UNITED STATES PATENT AND TRADEMARK OFFICE
CERTIFICATE OF CORRECTION

PATENT NO. : 3,988,481
DATED : October 26, 1976
INVENTOR(S) : Samuel T. Coulter et al It is certified that error appears in the above-identified patent and that said Letters Patent are hereby corrected as shown below:

In the Abstract, line 9, "foaming" should be --forming--.

Column 6, Claim 2, line 2, "molcular" should be --molecular--.

*Signed and Sealed this*

*Fourth Day of January 1977*

[SEAL]

*Attest:*

RUTH C. MASON
*Attesting Officer*

C. MARSHALL DANN
*Commissioner of Patents and Trademarks*